US006770198B2

(12) United States Patent
Newton et al.

(10) Patent No.: US 6,770,198 B2
(45) Date of Patent: Aug. 3, 2004

(54) METHOD OF TREATING WASTE WATER (76) Inventors: Robert Kingsley Newton, 13 Dumfries Court, Andergrove, Mackay (AU), QLD 4740; Kenneth Michael Bellamy, 9 Chablis Court, Molendinar (AU), QLD 4214

( * ) Notice: Subject to any disclaimer, the term of this patent is extended or adjusted under 35 U.S.C. 154(b) by 0 days.

(21) Appl. No.: 09/749,529

(22) Filed: Dec. 28, 2000

(65) Prior Publication Data

US 2001/0011643 A1 Aug. 9, 2001

Related U.S. Application Data (63) Continuation-in-part of application No. PCT/AU99/00525, filed on Jun. 29, 1999.

(30) Foreign Application Priority Data

Jun. 29, 1998 (AU) ................................. PP4393

(51) Int. Cl.[7] .............................. C02F 3/34; C02F 3/30; C02F 3/04
(52) U.S. Cl. ........................ 210/601; 210/615; 210/630; 210/150
(58) Field of Search ................................ 210/605, 601, 210/615–617, 630, 150, 151, 169, 916; 119/227, 260

(56) References Cited

U.S. PATENT DOCUMENTS

| 1,456,914 | A | * | 5/1923 | Coombs |
| 3,715,304 | A | * | 2/1973 | Hefermehl |
| 3,994,803 | A | * | 11/1976 | Neff et al. |
| 4,427,548 | A | * | 1/1984 | Quick, Jr. |
| 4,824,563 | A | * | 4/1989 | Iwahori et al. |
| 4,826,601 | A | * | 5/1989 | Spratt et al. |
| 5,180,495 | A | | 1/1993 | Thuer et al. |
| 5,578,211 | A | | 11/1996 | Dickerson |
| 5,733,454 | A | * | 3/1998 | Cummings |
| 5,798,044 | A | * | 8/1998 | Strohmeier et al. |
| 5,906,745 | A | * | 5/1999 | Eto |
| 6,287,469 | B1 | * | 9/2001 | Ashburn et al. |

FOREIGN PATENT DOCUMENTS

| AU | 76324/98 | 12/1998 |
| DE | 29802903 | 11/1998 |

* cited by examiner

Primary Examiner—Fred Prince (57) ABSTRACT

The current invention relates to treatment of waste water and in particular to treatment of sewerage effluent. The current invention broadly resides in a method of treating waste water in a waste water reticulation system including inoculating the waste water with an inoculum of selected microorganisms at a site prior to the treatment plant in the waste water reticulation system or discharge site where there is no treatment plant in the waste water reticulation system; and incubating the waste water inoculated with the selected microorganisms to form a culture that reduces waste in the inoculated waste water.

18 Claims, 6 Drawing Sheets

METHOD OF TREATING WASTE WATER

RELATED APPLICATION INFORMATION

This application claims priority as a Continuation-In-Part application under 35 U.S.C. §120 to International Patent Application Serial No. PCT/AU99/00525, filed Jun. 29, 1999, which was published in English on Jan. 6, 2000 and which is incorporated herein by as though set forth in full. This application also claims priority under 35 U.S.C. §119 to Australian Application No. PP4393 filed Jun. 29, 1998, which is also incorporated herein by reference as though set forth in full.

FIELD OF INVENTION

This invention relates to a method of treating waste water. The invention has particular application to the treatment of waste water where there is a relatively long period before the waste water is discharged. This invention has particular but not exclusive application to the treatment of sewerage effluent and for illustrative purposes only reference will be made to this application.

PRIOR ART

The conventional method of treating sewerage is transferring sewerage effluent through a network of sewerage mains and pumping stations to a sewerage treatment plant at or close to the site where the treated effluent will be released. At the conventional sewerage treatment plants, the sewerage effluent undergoes a series of anaerobic and aerobic incubations to remove waste including organic matter, other solids, nitrogen and phosphate and disinfection to reduce the number of pathogenic organisms in the sewerage effluent prior to its release.

As the sewerage effluent passes through the sewerage mains and pumping stations, the sewerage effluent becomes an incubating culture with the production of a variety of fermentation products including hydrogen sulphide and ammonia. The composition of the sewerage effluent is continuously changing during its passage. The noxious and aggressive atmospheres produced in the sewerage mains and sewerage treatment plants damages the mains pipe and pumping and plant equipment which as a result require regular maintenance.

At the sewerage treatment plant the fermentation products and greater numbers of undesirable microorganisms cause further problems including foaming of aerated tanks in sewerage treatment plants as a result of the proliferation of filamentous bacteria incubating in a nutrient rich environment. The foaming problem in aerobic tanks results in the need for additional treatment and extends the time for treatment before the treated sewerage effluent can be released. These problems cause the cost of treatment to rise.

SUMMARY OF THE INVENTION

The current invention was developed from the concept of using rising mains, gravity mains and various pumping wells as effective anaerobic and aerobic incubators using cultures of selected microorganisms. That is, the current invention uses the time and space provided by the collection and transfer system to effectively treat the sewerage effluent before it reaches the sewerage treatment plant. The inoculation with selected microorganism cultures results in competition for available nutrients and thus alters the type and number of microorganisms and the type and quantity of fermentation products produced in the sewerage effluent.

The invention in one aspect broadly resides in a method of treating waste water in a waste water reticulation system including inoculating the waste water with an inoculum of selected microorganisms at a site prior to the treatment plant in the waste water reticulation system or discharge site where there is no treatment plant in the waste water reticulation system; and incubating the waste water inoculated with the selected microorganisms to form a culture that reduces waste in the inoculated waste water.

In one preferred form the site of inoculation to the waste water is as close as possible to the site of entry of the waste. In another form the site of inoculation is a site through which flows between 25% and 75% of the volume of the waste water in the reticulation system.

In another aspect, the current invention broadly resides in a method of treating waste water in a waste water reticulation system including:

inoculating the waste water with an inoculum of selected microorganisms at a site through which flows between 25% and 75% of the volume of the waste water in the reticulation system; and incubating the waste water inoculated with the selected microorganisms to form a culture that reduces waste in the inoculated waste water.

Preferably the inoculum of selected microorganisms is inoculated into the waste water at a site through which flows approximately 50% of the volume of the waste water in the reticulation system.

Preferably the inoculation site occurs within the first 25% of time or distance to the treatment plant.

Inoculation preferably occurs by inoculation means which may include spraying of inoculum from a nozzle or passing waste water over a support medium seeded with selected microorganisms. Inoculation may occur in existing sewerage mains, pump wells, silt collection traps and transfer stations. In addition, the surface area in the collection and transfer network provides potential sites for support mediums of inoculating microorganisms. Inoculation means may include inoculation chambers as described below.

The inoculation means employed at a particular site will depend on the conditions at the site. For example, where the level of anaerobic activity will be high because of long rising mains or long retention time due to slow flow, aerosol inoculation is preferred as it allows proliferation of augmented aerobic organisms in the effluent to help maintain a balance of aerobic and anaerobic activity and this is particularly relevant where the inoculum contains organisms which allow an increased level of dissolved oxygen to appear in the effluent during anaerobic activity. In another example where there are long gravity mains and there will be relatively high aerobic activity, a support medium of seeded selected microorganisms are positioned so that effluent passing over is inoculated with the microorganisms. This allows proliferation of augmented anaerobic organisms in the effluent to help maintain a balance of aerobic and anaerobic activity allowing some increased anaerobic activity in a largely aerobic environment.

The inoculum of selected microorganisms preferably is a mixed population of microorganisms. The inoculum of selected microorganisms preferably includes anaerobic and aerobic microorganisms. The inoculum of selected microorganisms is preferably a mixed population where the proportions of which may vary depending on the type of waste introduced into the waste water reticulation system. Further, the type of microorganisms selected may vary depending on the type of waste introduced into the waste water reticulation system. For example, where the waste introduced into the waste water reticulation system has a high proportion of fat or oil, lactic acid bacteria may be selected and an inoculum may contain a high proportion of lactic acid bacteria compared with other microorganisms. In creating the conditions where an inoculum contains a high proportion of lactic acid bacteria a relatively large amount of sugar may be added to serve as a substrate for lactic acid bacteria and other organisms which as a consequence forms acetic acid that assists in degrading the fat and oil substrates.

The selected microorganisms may include heterotrophic bacteria such as purple non-sulphur producing heterotrophic photosynthetic bacteria, *lactobacillus*, yeasts, *actinomycetes, Nocardia* species, ray fungi, *Bacillus* species, plankton and other synergistic microorganisms and chemoautotrophic bacteria. A preferred source of microorganisms is the commercially produced EM ("Effective Microorganisms") formulations.

Inoculum of selected microorganisms may be prepared as a batch culture or is prepared from a continuous culture.

The selected microorganisms are preferably chosen because of their ability to cooperate in reducing the waste to small molecular weight products, water and $CO_2$. The microorganisms are preferably chosen based on their ability to breakdown each others products.

The incubated inoculated effluent in the inoculation chambers allows the selected microorganisms to adapt to and reproduce in the effluent as a medium source. This reduces the environmental shock on the selected microorganisms when they are released to the retriculation system. In pump well inoculation chambers the subsequent culture incubates until a sensor signals for the release of the culture into the mains. In in-line inoculation chambers the subsequent culture constantly incubates in the provided media and the flow of effluent allows release of the culture through the media. The incubating culture in the inoculating chamber serves to inoculate further untreated effluent.

The method may include one or more further sites of inoculation in the waste water reticulation system. The further inoculation sites serve to boost the population of the selected microorganisms. As indicated above, the waste water effluent in a waste water reticulation system is dynamic and it undergoes constant change depending on the conditions that prevail at different stages in the waste water reticulation system. As a result of incubation at any one particular stage, the population of some of the selected microorganisms will increase whereas the population of other selected microorganisms will decrease. It is therefore preferred that a further inoculation is provided to the waste water effluent as it travels through the waste water reticulation system. By inoculating the waste water effluent again the population of the desired selected microorganisms can increase and thus continue to degrade the waste in the waste water effluent. With subsequent inoculation, there are accumulative effects whereby the further inoculum effectively augment deficiencies in the culture of the previously inoculated waste water effluent. In this way, a blanket effect is achieved which covers substantially all of the waste water effluent in the waste water reticulation system. With this accumulative effect the total volume inoculum to a system may reduce.

In one preferred form there is a secondary inoculation site through which flows approximately 75% of the volume of waste water effluent in the waste water reticulation system. Of the approximately 75% volume of the waste water effluent, 25% volume of the waste water has not been previously treated whereas approximately 50% volume of the waste water effluent has been previously treated with an inoculum of selected microorganisms.

In a further preferred embodiment there is a tertiary site which provides for further inoculation with an inoculum of the selected microorganisms where nearly all of the waste water effluent in the retriculation system is treated. A tertiary site inoculation is preferred where there is more than 750 kilo liters per day of effluent or waste is collected for transfer by rising main of more than one kilometer in length.

Inoculation means may include an inoculum reservoir having a housing, an inoculum source contained within the housing and means for dispensing the inoculum at a particular site. The inoculum may be in a concentrated form and be diluted prior to being dispensed. Other additives may be dispensed with the inoculum. Other additives may include acetic acid, citric acid, or sugar solutions. The inoculum may be contained in an incubator and be part of a continuous culture. On the other hand, the inoculum may be housed in a container and be prepared from a batch culture grown elsewhere and stored in the housing.

The inoculation means may include an inoculation chamber which is positioned between two mains and serves as a site to inoculate waste water effluent. The inoculation chamber is described in further detail below.

In another aspect, the invention broadly resides in an inoculation chamber including a housing with a waste water inlet and a waste water outlet; and a support medium means seeded with selected microorganisms wherein the waste water substantially passes over and through the support medium and is inoculated with microorganisms released therefrom.

The support medium means preferably includes a base layer of sand or crushed rock such as crushed blue metal but preferably zeolite. The support medium means preferably includes a second layer of porous clay or concrete bricks. Alternatively the second layer may include crushed rock such as blue metal that has a larger diameter than the material used for the first layer. The support medium means preferably includes a third layer of similar material as used in the first layer such as zeolite. The support medium means preferably includes a fourth upper layer of biologically activated ceramic. The biologically activated ceramic preferably includes selected microorganisms contained therein. The biologically activated ceramic preferably is arranged so that the waste water effluent becomes mixed, aerated with turbulence and inoculated with microorganisms therefrom. The inoculation chamber may also include a spray means for providing a spray inoculum to the waste water effluent.

BRIEF DESCRIPTION OF THE DRAWINGS

In order that this invention may be more readily understood and put into practical effect, reference will now be made to the accompanying drawings which illustrate a preferred embodiment of the invention and wherein.

DETAILED DESCRIPTION OF THE PREFERRED EMBODIMENT

Figure 1:
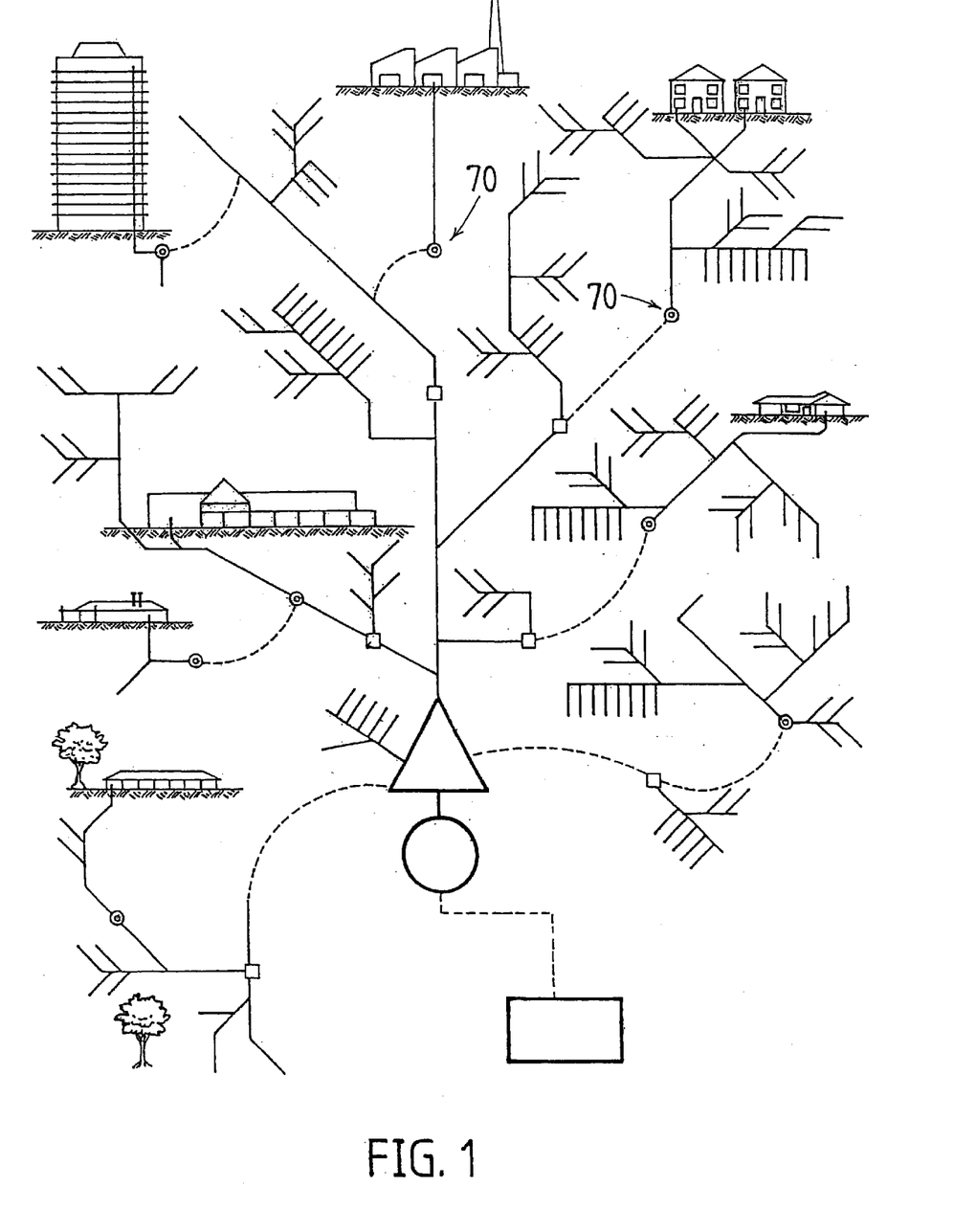
FIG. 1 is a diagrammatic view of the inoculation sites of the current invention in different residential, commercial and industrial locations.

With reference to FIG. 1 there shown the distribution of primary inoculation sites 70, secondary inoculation sites 71 and a tertiary inoculation site 72 relative to various residential locations 67 and 68, commercial locations 75 and 76, and industrial locations 65, 66, and 69. As described in greater detail below, as sewage effluent is collected from various residential locations 67 and 68, commercial locations 75 and 76, and industrial locations 65, 66, primary inoculation sites 70 introduce selected microorganism cultures into the sewage effluent. Thereafter, booster sites such as secondary inoculation sites 71 and a tertiary inoculation site 72 introduce additional microorganism cultures. Subsequently, a pump well 73 pumps the sewage effluent to a Treatment 74.

Figure 2:
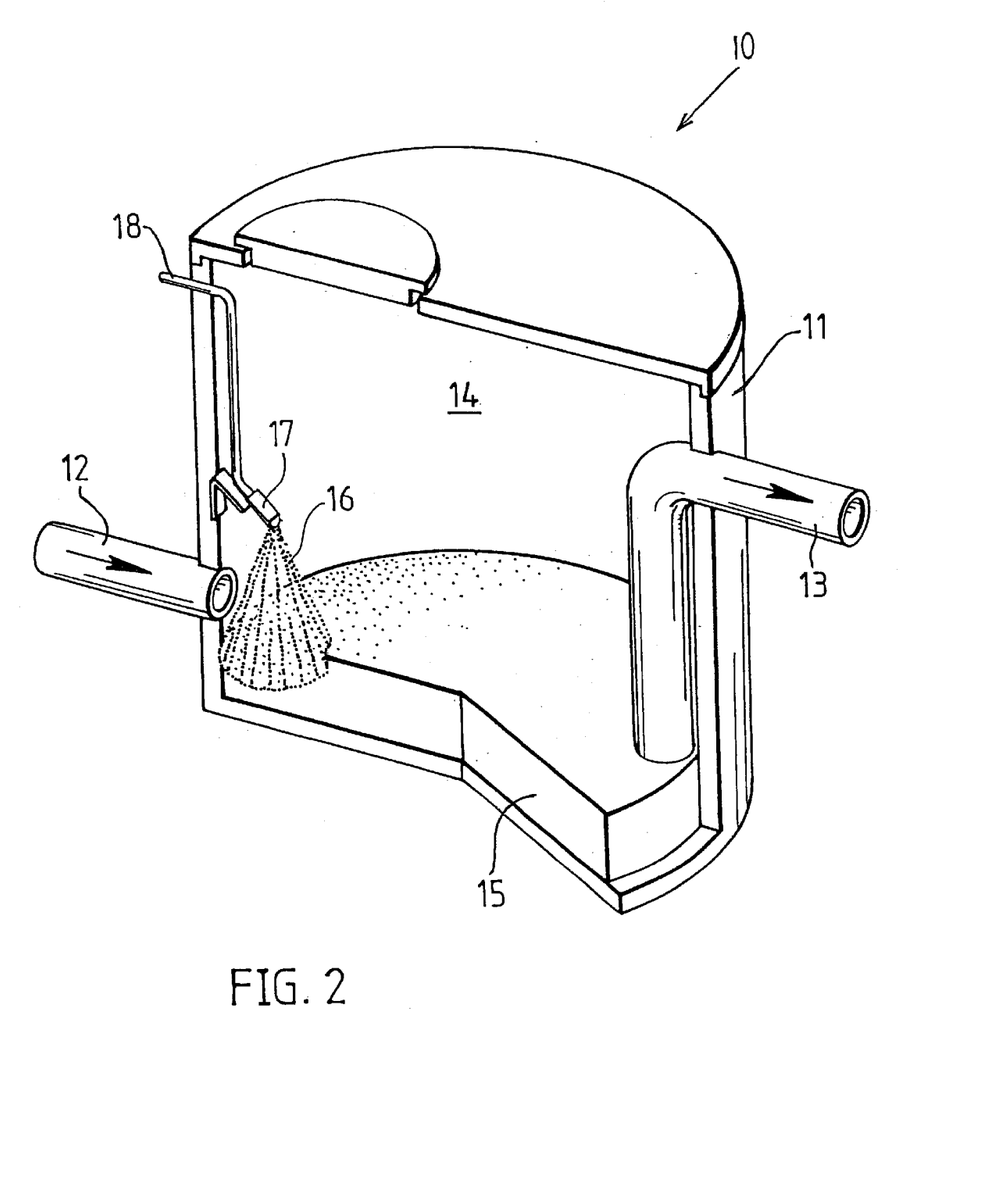
FIG. 2 is an inoculation site of the current invention at a mains pump well.

With reference to FIG. 2, there is shown a conventional pump well 10 having a housing 11, a waste water effluent inlet 12 and a waste water effluent outlet 13. The waste water effluent enters through the inlet 12 into the internal region 14 of the pump well 10. The waste water effluent 15 shown in the pump well 10 rises to a point where a sensor (not shown) actuates a signal for the pump (not shown) to start and pump the effluent 15 out of the chamber 10 through the outlet 13. The method of the current invention treats waste water effluent by introducing an inoculum of selected microorganisms 16 into the waste water effluent 15. The inoculum 16 is introduced by a spray nozzle 17 connected to a dosing line 18. The dosing line 18 is subsequently connected to an inoculum reservoir.

Figure 3A:
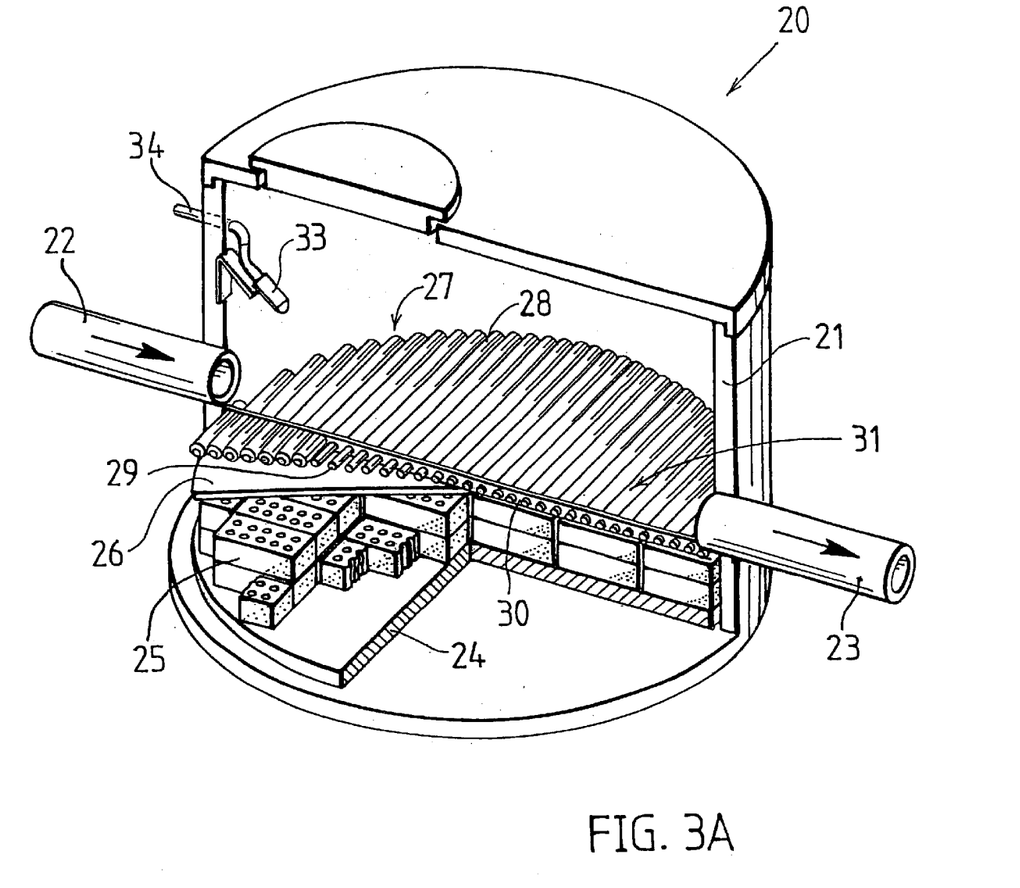
FIG. 3 is a diagrammatic view of inoculation chamber of the current invention.
Figure 3B:
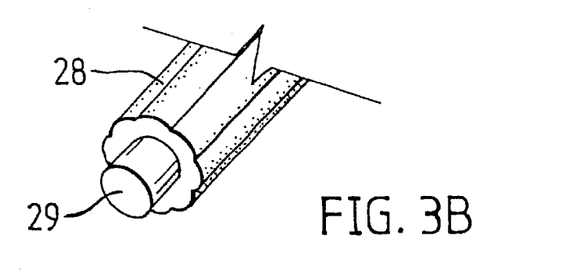

With reference to FIG. 3, there is shown an inoculation chamber 20 having a housing 21, an inlet 22, and an outlet 23. The inoculation chamber 20 includes a support medium 31 that consists of four layers. The base or first layer 24 consists of crushed zeolite. A second layer 25 consists of porous, clay or concrete perforated bricks. These bricks may also be stacked on top of each other to increase the depth of the layer 25. The third layer 26 consists of crushed zeolite and provides a flat surface for the fourth layer 27. The fourth layer 27 consists of biologically activated ceramic 28 mounted on polyethylene rods 29. The polyethylene rods 29 are connected together by a elongate shaft 30 which serves as a backbone holding the rods 29 relative to each other. The shaft 30 is made of stainless steel. The flow of the waste water effluent entering the inoculation chamber 20 from the inlet 22 becomes turbulent because of the position of the biologically activated ceramic 28 lying transversely across the direction of flow. The turbulence mixes the waste water effluent, aerates the waste water effluent, and inoculates the waste water effluent with microorganisms from the biologically activated ceramic 28 as it passes over and through the support medium. The inoculation chamber also includes a spray nozzle 33 connected to a dosing line 34 which in turn is connected to an inoculum reservoir. The spray nozzle 33 sprays the effluent with inoculum of selected microorganisms.

Figure 4A:
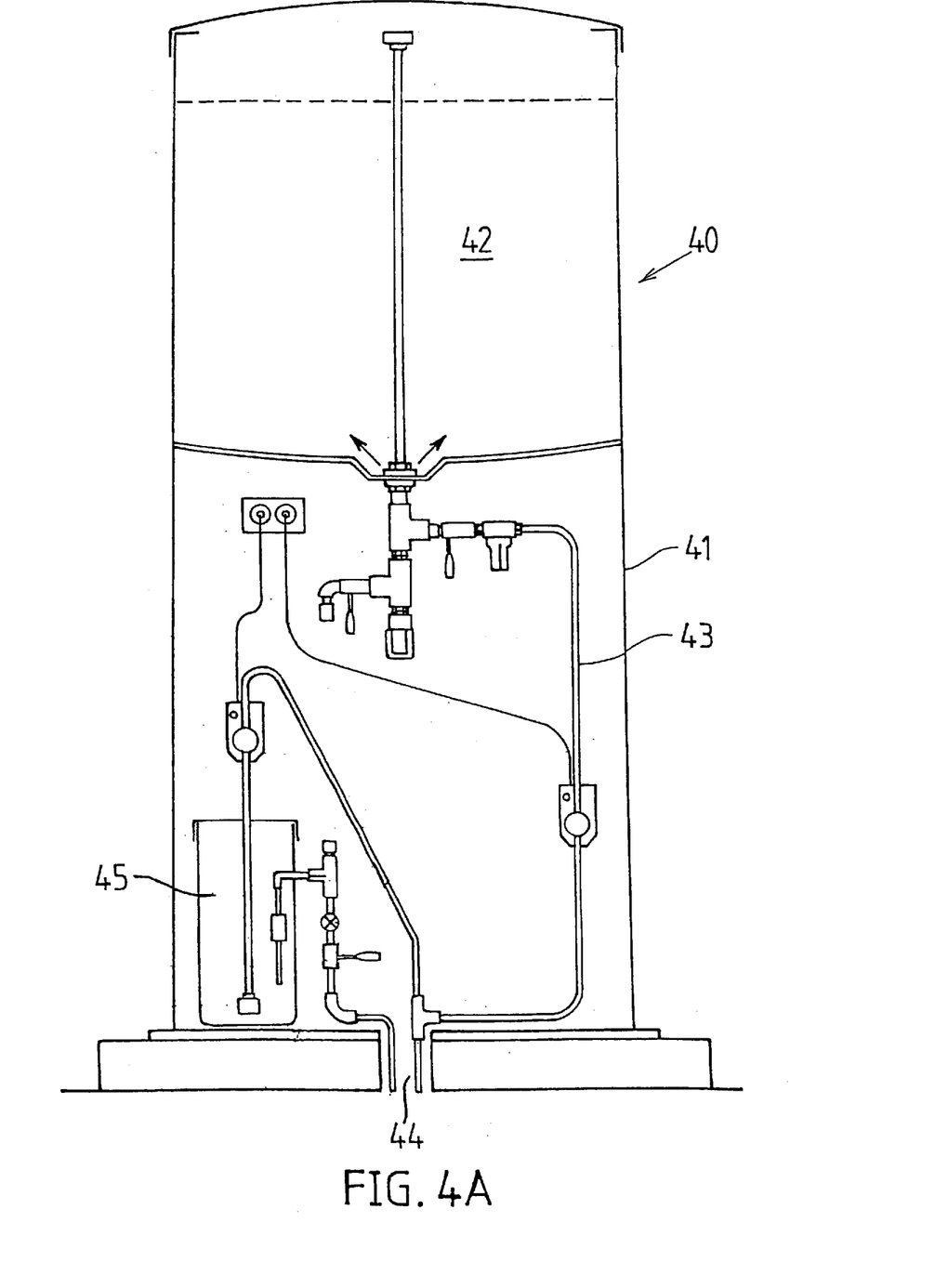
FIG. 4 is a diagrammatic view of an inoculum reservoir of the current invention.
Figure 4B:
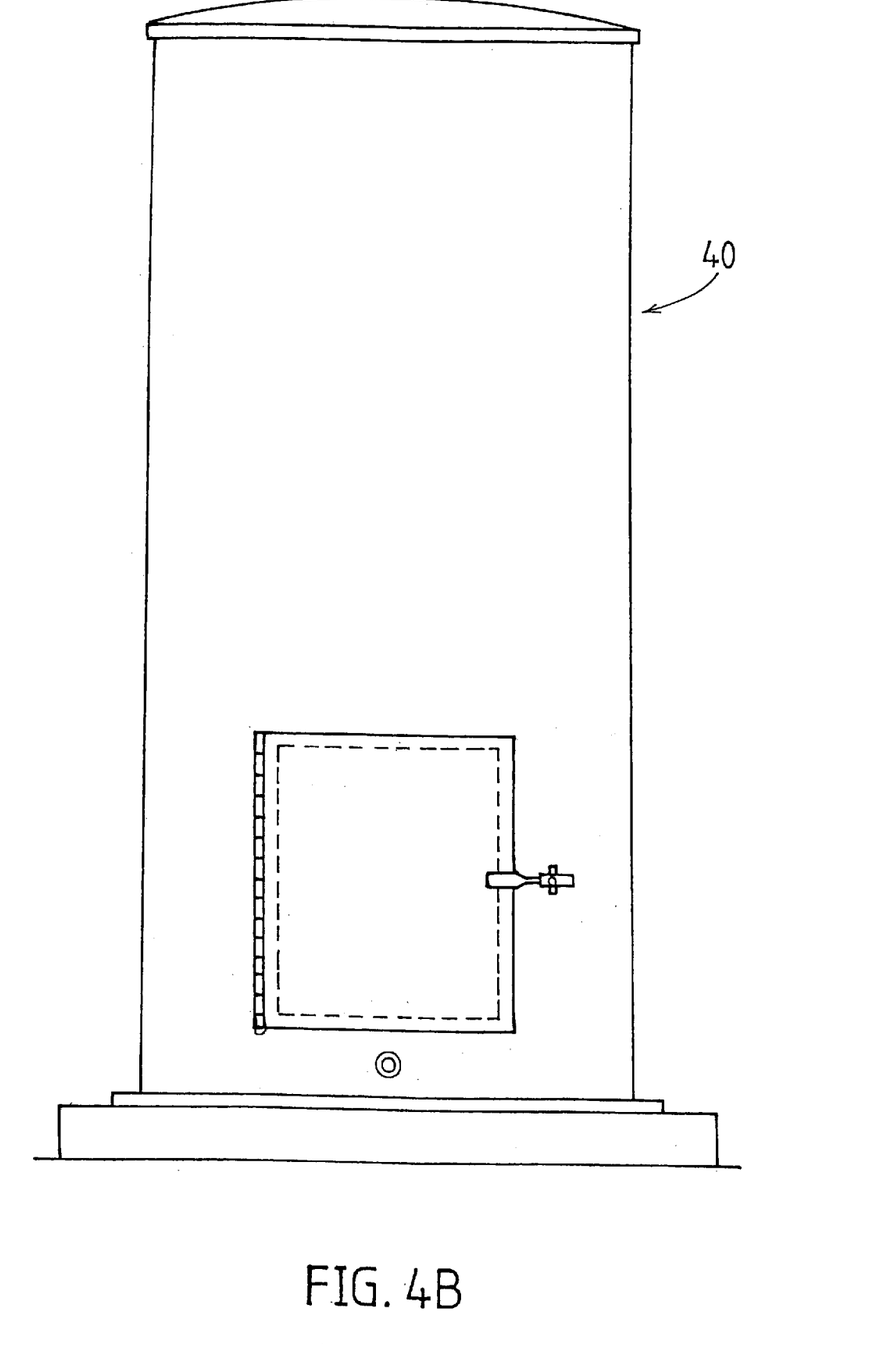
Figure 4C:
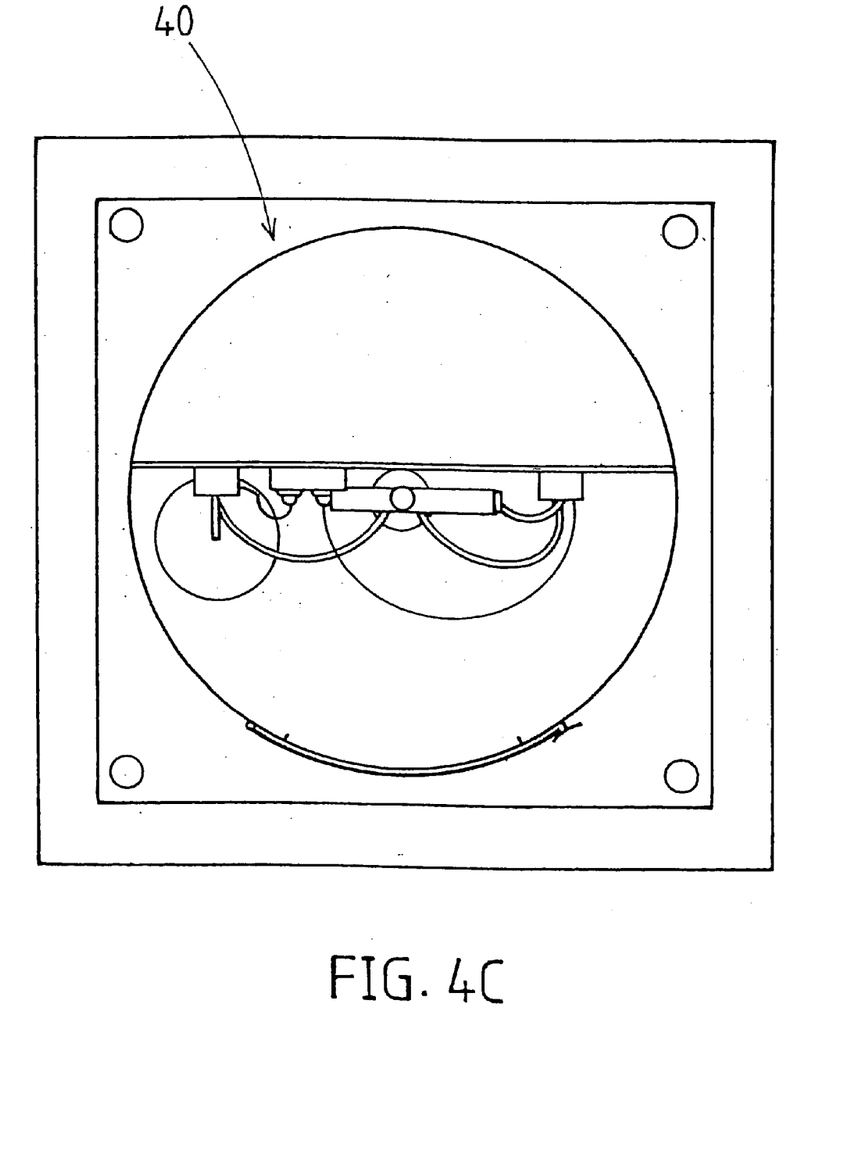

With reference to FIG. 4, there is shown an inoculum reservoir 40 having a housing 41, inoculum source 42, and supply lines 43 for providing an inoculum to the dosing line 44. The inoculum reservoir 40 also contains a water source 45 for diluting the inoculum as it is provided to the dosing line 44. Other additives may be added to the inoculum at the dosing line 44. These additives may include acetic acid, citric acid and sugar solutions. The inoculum source 42 is preferably a batch culture maintained at or near an exponential phase with the provision of nutrient substrate. Preferably there is provided a floating baffle which assists in maintaining anerobic bacteria. The water source may be refilled with potable water from the released treated effluent and may return some beneficial microorganisms. The water source and upper inoculum holding tank may contain at least one kg of biologically activated ceramic media which helps to prevent oxidation.

The preferred embodiment of the method of treating waste water in a waste water reticulation system includes inoculating substantially all the waste water effluent at least once, approximately 75% of the waste water effluent is inoculated twice, and approximately 50% of effluent is inoculated three times. Collection/retention/incubation areas are available in line such that 50% of all effluent passes through one such area within the first quarter of its route to the Treatment Plant. This may entail ensuring that dosed pump wells allow constant retention of approximately 750 mm of fluid by adjusting float sensors or, where gravity collection predominates, provision of the inoculation chambers. Preferably one inoculation/pump well inoculation chamber is present for each 125000 L/Day [7.5% for smaller systems] of expected normal effluent flow. Approximately 20% of the inoculation chambers would preferably be in-line inoculation chambers as shown in FIG. 3.

These inoculation sites should be divided into three categories: Primary sites, Secondary (booster) sites, and Tertiary (booster) sites.

Primary inoculation sites are chosen at the earliest possible collection point (either existing or installed) where flow is constant for at least eight (8) hours per day. In practical terms, this generally equates to the earliest Pumping Station or a nominated inoculation chamber site in a collection system which will generally process a maximum of 75000 L/day of effluent [or ten percent (10%) for smaller systems of the total system effluent flow].

Secondary (booster) inoculation sites are chosen to cover confluence of effluent such that one site exists for each two hundred thousand liters per day (200,000 L/day) [or twenty percent (20%) of the total effluent flow in the system for smaller systems].

Tertiary (booster) inoculation sites are installed at each Main Pumping Station, that is those which pump directly to a Treatment Works or a major collection point in the system, and collects seven hundred and fifty thousand liters to one megaliter per day of effluent.

Where there is a rising main following of 0.25 km or more there is preferably an inoculation site. Any trouble spot locations are considered for further inoculation sites or to coincide with choice of primary or secondary inoculation sites as above. Trouble spots include areas where there is a high fat concentration in the effluent or areas where there is unusually long retention times.

Overall inoculation sites are selected such that there is on average one inoculation site for each 125000 Liters of effluent flow per day provided that in each case at least a primary and secondary inoculation as set out above is achieved and that systems which have a main collection point with either rising main or gravity transfer main following of 1.0 km or more also have a tertiary inoculation site or sites prior to such transfers.

Typically selection of inoculation sites according to this formula will mean that for a collection system which transfers one megaliter per day will have 13 inoculation sites of which, 8 will be primary inoculation sites, 4 will be secondary inoculation sites and 1 will be a tertiary inoculation site. This pattern may be repeated over several sections of a larger system. However, it is likely that significant economies of scale will be produced where accumulative dosing is possible between several sections on a system of 10 megaliters per day flow volume or more.

Using EM "Effective Microorganisms" formulations or similar containing purple non-sulphur producing heterotrophic photosynthetic bacteria, *lactobacillus*, yeasts, *actinomycetes*, ray fungi, *bacillus*, chemoautotrophic organisms, phytoplankton and other synergistic organisms; treatment for odour control and fat removal requires an overall inoculation rate of 2.5 ppm inoculum concentrate to the effluent.

For further accumulative treatment to effect partial nutrient removal, removal of remaining aggressive atmospheres, and reduction in BOD, TSS and other indicators over time overall inoculation rate of 25 ppm inoculum to effluent is required. Inoculation at higher rates may be needed to target specific problems in a given system. For example a 1,000,000 L/day effluent flow requires approximately 25 L/day of inoculum concentrate for treatment.

The preferred embodiment uses Em-1 as the inoculum concentrate. This concentrated inoculum may be extended/diluted such that material to be injected is made up in the following manner:
3% Inoculum concentrate,
3% molasses or sugar solution, and
94% Aged water (being chlorinated or otherwise disinfected water left to stand out of sunlight in a closed but vented vessel for a minimum of 3 days)
(e.g. 25 liters of inoculum concentrate equates to 833 liters of extended inoculum)

The extended inoculum is preferably allowed to stand in a sealed and pressure vented container in indirect sunlight for 5 to 7 days or until pH of the dilution reaches 3.5 or lower. Further dilution may occur at a ratio of at least 4 parts water to one part extended inoculum on site at the point of inoculation. The above extended inoculum should be delivered such that 10% is injected in the tertiary phase of system inoculation and the balance is divided evenly between all other sites. (e.g. Tertiary site 83 liters/day plus all other sites 12×62.5 liters per day is 833 L/day for a 1,000,000 l/day effluent stream.)

At all inoculation sites, dosing of extended inoculum should be completed such that inoculum is delivered evenly and regularly over a given period (i.e. 24 hours per day). At primary and secondary inoculation sites this dosing should be done with a pulse action dosing pump with pulse intervals and volumes quantified to deliver the required amounts of material over each 24 hour period. At tertiary inoculation sites this delivery should be by pressurised constant delivery over each 24 hour period.

Where there is a relatively high fat or oil concentration, formulations including a ratio of sugars closer to 3% concentrated inoculum and 10% sugars/molasses more effectively address the problem. The extended inoculum produces a much higher concentration of acetic acid. This same result can be achieved by adding citric acid or acetic acid to the inoculum prior to dilution with carrier water.

The spray nozzle sprays directly at the surface of the incoming effluent and over the point of turbulence. It is preferred to encourage the inoculum to mix with effluent at this point. The dosing spray should not reach either walls of the chamber or other equipment in the well. Spray droplets should pass directly to the surface of the effluent.

Low dose, multipoint, regular inoculation can be applied to any system. This includes partially closed loop systems and on-site systems. In these instances, early dosing points are selected (as early as the first waste trap or grease trap or the toilet cistern(s) or bowl(s)) and a recirculation loop is installed in the on-site plant to encourage re-inoculation or accumulation (booster) dosing. A secondary inoculation point is installed in an incubation chamber closer to the plant (normally a transfer station or pump well). Again, fermentation in an anaerobic state is conducted first followed by chambers for aerobic activity. In this case fermentation will normally be conducted in installed fermentation tanks or chambers (generally above ground) and aeration will be in similar tanks with air driven clarification. Bio-filtration (inoculation chambers) and return of potable water from end of system may be used in the seeding process.

The present invention concerns a system wide inoculation method (as opposed point inoculation) and addresses all the effluent in a system several times over a period (as effluent proceeds through the system). Calculation of appropriate inoculation rates are made given the time and any ability to extend it by installing up-line retention points.

A variation of the method splits the functions at the treatment plant and provides for installation of large chambers designed to perform both fermentation and aeration functions up line in a collection system. That is, installing tanks and equipment to collect from each 50 to 70 households or equivalent in a system and having only tertiary treatment processes down line.

In in-line inoculation chambers the cylindrical shape of the ceramic pieces, threaded onto a flexible rod allows a rippling motion of the effluent as it passes through the inoculation chamber. This motion approximates the motion of a creek over a gravel bed and does encourage transfer between the anaerobic holding areas below the sheet of ceramics in the inoculation chamber. Also encourages some aerobic activity in and on the ceramics themselves. The rippling motion also serves to keep a partial self-cleaning process going in the inoculation chamber.

Substantially the same principals of early, accumulative, consistent inoculation can be applied to an on-site, recirculating effluent treatment system. For example, in an aquaculture environment, these principals may be employed to bring about substantially total recirculation of water. This requires:

a Primary inoculation at the point of entry of top-up water to Growing/Holding Tanks.
  b Installation of inoculated in-line biological filter(s) at or near the point of water draw-off from holding/growing tanks.
  c Installation of anaerobic retention point with inoculation prior to water return line to holding/growing tanks.
  d Consistent Inoculation system wide to approximate to 10 ppm to the body of water held.
  e Retention of any flocculant/sludge captured in the anaerobic tanks—even between crops.

Similarly, in an on-site sewerage treatment system, early inoculation at or near the first collection point for effluent (even as early as the toilet bowl or waste trap), installation of a macerating pit with inoculation before anaerobic fermentation tank(s), installation of an inoculated in-line biological filtration point after aerated processes and recirculation of approximately 10% of flow from the biological filter to the initial macerating sump. In this instance consistent inoculation rates may be initially as high as for flow-through waste collection systems (i.e. 25 ppm) but will generally decline over a period of 6 to 12 months until they reach an equilibrium level of approximately 2.5 ppm to effluent flow.

The use of the method described above may provide the following advantages:

1. Odour Control: Reduction in odour has been recorded throughout the system with the use of the aforementioned method.
2. Fat Consumption: A noticeable result of consistent inoculation is consumption of fats in wells and residence points throughout the system downstream of inoculation points. Fats do not build up as normal in downstream wells. Where fat build-up has been a problem in a system, maintenance becomes significantly simplified in that any remaining material on well walls can be easily hosed off. Build-ups do not extend in caked structures off the walls and do not require manual scraping or chipping to remove. Similarly, there are no large fat loads downstream after cleaning and no re-constitution of fats later in the system. Typically, measurable reductions in water borne fat content are observable after approximately ninety days of consistent inoculation.
3. Foaming Control: As a consequence of the above, lower fat content in the sewerage Treatment Plant results in lower populations of filamentous bacteria and consequently, significant reductions in foaming at the treatment plant.
4. Noxious and aggressive atmosphere control: Upon establishment of a consistent and accumulative inoculation program, noxious and aggressive atmospheres are significantly reduced throughout a collection and transfer system. This is particularly important for maintenance and complaint management issues as well as workplace health and safety issues.
5. Oxygen bonus in long rising mains: Traditionally, long rising mains have been a source of some concern for collection and transfer systems in that anaerobic activity and putrefaction in-line in such mains can lead to production of large amounts of hydrogen sulphide and other gases. In many instances, the injection of oxygen to such lines has been employed as a chemical countermeasure to address this issue. An early inoculation program and the development of a persistent culture of low temperature fermentation organisms—particularly including non-sulphur producing, heterotrophic photosynthetic bacteria—throughout a given system results in a balance of micro-organic activity occurring which allows the presence of dissolved oxygen to be equivalent to or higher than that obtained by normal levels of oxygen injection. This suggests that where a full program of early inoculation is adopted (including primary, secondary and tertiary level inoculation as described here), oxygen injection costs can be reduced.
6. Up-Line Nutrient Removal: An accumulative reduction in nutrient (N&P) levels in waste water is achieved where a consistent inoculation program is continued over a 12 to 18 month period. As beneficial cultures develop, the rate of reduction of N & P in effluent to Sewerage Treatment Plant increases to a plateau level of 50% removal. It is noticeable, however, that given a tertiary phase treatment in Plant, rapid nutrient removal occurs where seeded cultures of microorganisms are already present in effluent from the Treatment Plant.
7. BOD (biochemical oxygen demand) reduction up-line: A trend of BOD reduction occurs gradually over a period of time as beneficial cultures are established.
8. TSS (total suspended solids) Reduction up-line: A trend of TSS reduction occurs gradually over a period of time as beneficial cultures are established.
9. Pathogen Control: This feature is of particular importance as a means of diversifying the risks involved in sewerage spills, overflows and the like. It appears as if competitive activity among beneficial microorganisms in the inoculum results in far less proliferation of pathogens than would otherwise be expected in effluent and in a much more rapid decline in such pathogenic populations given discharge to the environment than would otherwise be expected. This is particularly true where discharge occurs in an area where effluent containing "EM" formulations as the inoculum is exposed to sunlight.

It will of course be realised that while the foregoing has been given by way of illustrative example of this invention, all such and other modifications and variations thereto as would be apparent to persons skilled in the art are deemed to fall within the broad scope and ambit of this invention as is herein set forth.

What is claimed is:

1. A method of treating waste water comprising:
   collecting waste water using a reticulation system terminating in at least one treatment plant, at least one discharge site, or combinations thereof;
   inoculating an inoculum of selected microorganisms into the waste water using at least one primary, at least one secondary, and at least one tertiary inoculation site prior to the treatment plant in the waste water reticulation system or discharge site; and
   incubating the inoculated waste water to substantially reduce waste in the inoculated waste water;
   wherein the frequency of inoculation and the amount of microorganisms in each inoculum maintains a substantially constant and continuous culture in the waste water reticulation system and wherein the tertiary site further inoculates with the inoculum of selected microorganisms at a site where nearly all of the waste water effluent in the reticulation system is treated.

2. The method as claimed in claim 1, wherein the inoculation site occurs within the first 25% of time or distance to the treatment plant.

3. The method as claimed in claim 1, wherein there is a secondary inoculation approximately site through which flows 75% of the volume of waste water effluent in the waste water reticulation system.

4. An inoculation chamber used in the treatment of waste water in a waste water reticulation system as claimed in claim 1 comprising:
   a housing with a waste water inlet and a waste water outlet; and
   a support medium means seeded with selected microorganisms wherein waste water substantially passes over and through the support medium and is inoculated with microorganisms released therefrom.

5. The inoculation chamber as claimed in claim 4 wherein the support medium means has a layer of biologically activated ceramics containing microorganisms.

6. The inoculation chamber as claimed in claim 4 further comprising a spray means for providing a spray inoculum to the waste water effluent.

7. The method according to claim 1, wherein there is an inoculation site for each 125000 liters of effluent flow per day provided that in each case at least a primary and secondary inoculation is achieved.

8. The method according to claim 1, wherein the reticulation system has at least one main collection point with either rising main or gravity transfer main following 1.00 km or more also have a tertiary inoculation site or sites prior to either rising main or gravity transfer main.

9. The method according to claim 1, wherein rate of delivery of inoculum into the waste water is substantially the same at each primary and secondary inoculation site.

10. The method according to claim 1, wherein the inoculum comprises a mixed population of aerobic and anaerobic microorganisms for assisting in reducing compounds in the waste water to small molecular weight compounds.

11. The method according to claim 10, wherein the microorganisms include heterotrophic photosynthetic bapteria, lactobacillus, yeasts, actinomycetes, nocardia species, ray fungi, plankton, and other chemo autotrophic bacteria and/or lactic acid bacteria.

12. The method according to claim 1, wherein the inoculum further comprises acetic acid, citric acid, or sugar.

13. A method of treating waste water comprising:

collecting waste water through a reticulation system on route to a treatment plant, discharge site or both;

inoculating the waste water with an inoculum of selected microorganisms at one or more primary or secondary inoculation site through which flows between 25% and 75% of the volume of the waste water in the reticulation system;

inoculating the waste water at one or more tertiary site wherein nearly all of the waste water effluent in the reticulation system is treated; and incubating the waste water inoculated with the selected microorganisms to form a culture that reduces waste in the inoculated waste water.

14. The method as claimed in claim 13 wherein the inoculum of selected microorganisms is inoculated into the waste water at a site through which flows approximately 50% of the volume of waste water in the reticulation system.

15. The method as claimed in claim 13, wherein the inoculation site occurs within the first 25% of time or distance to the treatment plant.

16. The method as claimed in claim 13, wherein there is a secondary inoculation site through which flows approximately 75% of the volume of waste water effluent in the waste water reticulation system.

17. The method as claimed in claim 13, wherein there is an inoculation site for each 125000 liters of effluent flow per day provided that in each case at least a primary and secondary inoculation is achieve.

18. The method according to claim 13, wherein the reticulation system has at least one main collection point with either rising main or gravity transfer main following 1.00 km or more also have a tertiary incoculation site or sites prior to either rising or main gravity transfer main.

* * * * *